United States Patent

Bergamini

[11] Patent Number: 6,065,492
[45] Date of Patent: May 23, 2000

[54] GAS MASS FLOW METERING VALVE

[75] Inventor: Lorenzo Bergamini, Bari, Italy

[73] Assignee: Nuovo Pignone S.p.A., Florence, Italy

[21] Appl. No.: 08/739,405

[22] Filed: Oct. 29, 1996

[30] Foreign Application Priority Data

Oct. 30, 1995 [IT] Italy ................... MI95A2234

[51] Int. Cl.[7] .................... F16K 31/12; F16K 47/00
[52] U.S. Cl. .................. 137/487; 251/118; 137/487.5
[58] Field of Search ................. 137/487, 487.5; 251/159, 174, 314, 118

[56] References Cited

U.S. PATENT DOCUMENTS

| | | | |
|---|---|---|---|
| 4,058,141 | 11/1977 | Hasinger et al. | 138/39 |
| 4,149,254 | 4/1979 | Molusis . | |
| 4,150,811 | 4/1979 | Condit | 251/315 |
| 4,180,100 | 12/1979 | Kolb et al. | 251/118 |
| 4,402,485 | 9/1983 | Fagerlund | 251/118 |
| 4,406,161 | 9/1983 | Locke et al. . | |
| 5,020,568 | 6/1991 | Taylor | 251/118 |
| 5,271,601 | 12/1993 | Bonzer et al. | 251/118 |
| 5,482,249 | 1/1996 | Schafbuch et al. | 251/118 |

FOREIGN PATENT DOCUMENTS 730865  8/1932  France .

*Primary Examiner*—Henry Bennett
*Assistant Examiner*—Joanne Y. Kim
*Attorney, Agent, or Firm*—Kramer Levin Naftalis & Frankel LLP

[57] ABSTRACT

A gas flow control valve which enables mass flow to be measured using a flow straightener in a valve entry duct, a tube for lengthening the entry duct into the valve, a valve element exit port with suitably radiused edges and a flow stabilizer in the valve exit duct. Upstream and downstream pressure taps are positioned immediately upstream of the flow straightener and downstream of the flow stabilizer respectively. This enables the flow rate to be controlled not by the formulas traditionally used for valve dimensioning, but by formulas derived from more accurate formulas used for calculating mass flow with standard members of a fixed restriction type.

13 Claims, 4 Drawing Sheets

GAS MASS FLOW METERING VALVE

FIELD OF THE INVENTION

This invention relates to a valve which, using a flow straightener in the valve entry duct, and a valving element passage port with suitably radiused edges, a stabilizer in the valve exit duct, and by positioning upstream and downstream pressure taps of the valve immediately upstream of said flow straightener and downstream of said stabilizer respectively, enables a gas mass flow to be effectively and accurately measured and controlled, using formulas of proven accuracy relative to standard measurement members of a fixed restriction type.

BACKGROUND INFORMATION

Gas flow measurement devices are known which use a control valve as the throttling member to provide data for calculating flow rate on the basis of the degree of opening, the absolute inlet pressure and temperature, the total pressure drop across the valve and the physical properties of the gas. Compared with measurement members of fixed restriction type (orifice plates, nozzles etc.), calculating the flow rate with these known devices is more complicated. Accurate modelling of pressure dissipation and recovery remains particularly arduous because of the difficulty in locating the position of the vena contracta as the degree of opening and the discharge conditions (in terms of Reynolds number and Mach number) vary, making it impossible in the case of the most commonly used valves to measure the effective pressure in the contracted section.

The problem of obtaining a sufficiently accurate model of the pressure recovery downstream of the restricted section is rather complicated as it is always accompanied by turbulent dissipation. This results in pulsation in the pressure measurement downstream of the restriction and hence requires a downstream pressure tap to be located at a distance of 5–10 diameters from the valve. A consequence of this lack of accurate knowledge of the flow within the valve is the need for experimental tests to obtain the characteristics of a non-specialized valve for use as a measurement member.

In practice, the difficulties in modelling the expansion through the variable geometry restriction and the dissipation within the downstream ducts are solved experimentally by a large number of tests under different operating conditions.

On the other hand, there are numerous examples of fixed restriction measurement members which have been designed and experimented to give good repeatability of the shape and location of the vena contracta and to obtain an isentropic flow upstream of the restriction, thus enabling the flow rate to be calculated by very accurate formulas. Good accuracy of these members is however limited to relatively narrow operating ranges in terms of flow rate and pressure drop. These limits, which can be accepted in the practical application of fixed devices, become a problem in the case of valves which not only have to control flow but also have to simultaneously operate under the most extensive discharge conditions, from subsonic regimes to critical conditions.

OBJECTS AND SUMMARY OF THE INVENTION

An object of the present invention is to obtain an improved valve providing performance in terms of measurement accuracy which is comparable with that obtainable from fixed restriction measurement members, from whose accurate mass flow calculation formulas are derived the formulas used in the present invention, but with a greater range in terms of flow rate and relative pressure drop.

A further object of the present invention is to provide a structure which simplifies the flow calculation under the various measurement conditions and reduces the burden of characterisation tests by virtue of better modellability.

The structure of the improved valve, which achieves the stated objects, combines in a single assembly the characteristics and functions of control valves and measurement members, while at the same time eliminating, both at the intrinsic architectural level of the invention and by the addition of special devices and expedients, all the limits and defects which valves and measurement members individually present in extending the range of operation.

In order to reduce flow modelling problems and hence use, for mass flow calculation, accurate formulas derived from those used by standard fixed restriction measurement members, the valve has been structured such as to enable the position and length of the vena contracta to be identified and controlled. It has also been made possible to measure the downstream pressure in this position instead of external to the valve downstream of pressure recovery, hence eliminating the need for and complexity of mathematically modelling the physical phenomena present in the connection portion between the vena contracta and the downstream pipe. A whole series of expedients have also been adopted to reduce possible disturbance and perturbation in measuring the vena contracts pressure. In practice the improved valve becomes mainly a good variable port measurement member while at the same time providing a control function with excellent rangeability as the extent of the measurement range which is intrinsically associated with the extent of the control range.

More specifically, the gas mass flow metering valve, comprises an entry duct, an exit duct, a valving element provided with a passage port, a seal ring cooperating with said valving element wherein the seal ring is made to rotate by an operating means, means for measuring the pressure upstream and downstream of the valve, and means for measuring the valve gas temperature. The gas flow metering valve is characterised, according to the present invention, in that into the entry duct there is inserted a flow straightener, immediately downstream of which, within the valve body, there are positioned the valve upstream pressure taps. The entry duct is prolonged by a prolongation tube into the interior of the valving element nearly as far as the convergence region in correspondence with the exit port through an aperture in the valving element opposite the exit port. The valving element exit port is formed with an edge geometry consisting of a converging curvature arranged to convey the gas flow in such a manner as to cause it to assume a direction substantially parallel to the axis of the exit duct which is provided in its interior with a flow stabilizer. The valve downstream pressure taps are positioned within the valve upstream of said stabilizer, in proximity to said exit port.

In this respect, in addition to providing a compact valve and eliminating the need to characterise the connections, and drastically reducing pressure pulsation and hence turbulence and making the flow isentropic as far as the convergence region, the expedients enable the mass flow to be determined by accurate formulas derived from those used by fixed restriction measurement members, as will be further explained hereinafter.

According to a preferred embodiment of the present invention, the flow straightener is a straightener of honeycomb or multi-tube type.

According to a further preferred embodiment of the present invention, the flow or jet stabilizer consists of two inclined walls substantially forming a C section dividing the exit duct into three sectors, namely a central sector and two lateral flow recirculation sectors. The walls are joined together internally by a third wall connecting together the lateral flow recirculation sectors. The two walls are provided on their inner facing surfaces with corresponding inclined deflectors which define ports which gradually grow towards the valve exit. According to a further preferred embodiment of the present invention, the operating means for rotating the seal ring consists of a lever pivoted on the valve body, its longer arm being moved by a pin rigid with the valving element, the movement of the shorter arm being transmitted to the seal ring by a non-return device formed from a preloaded spiral spring wound about and forced onto an appropriate housing in the seal ring, wherein the spring is connected to the short arm of the lever.

Finally, according to a further preferred embodiment of said invention, the converging curvature of the valving element exit port is substantially a circular arc of radius equal to the width of the exit port.

The invention is further clarified hereinafter with reference to the accompanying drawings which illustrate a preferred embodiment thereof given by way of non-limiting example in that technical and constructional modifications can be made thereto without leaving the scope of the present invention.

DETAILED DESCRIPTION

Figure 1:
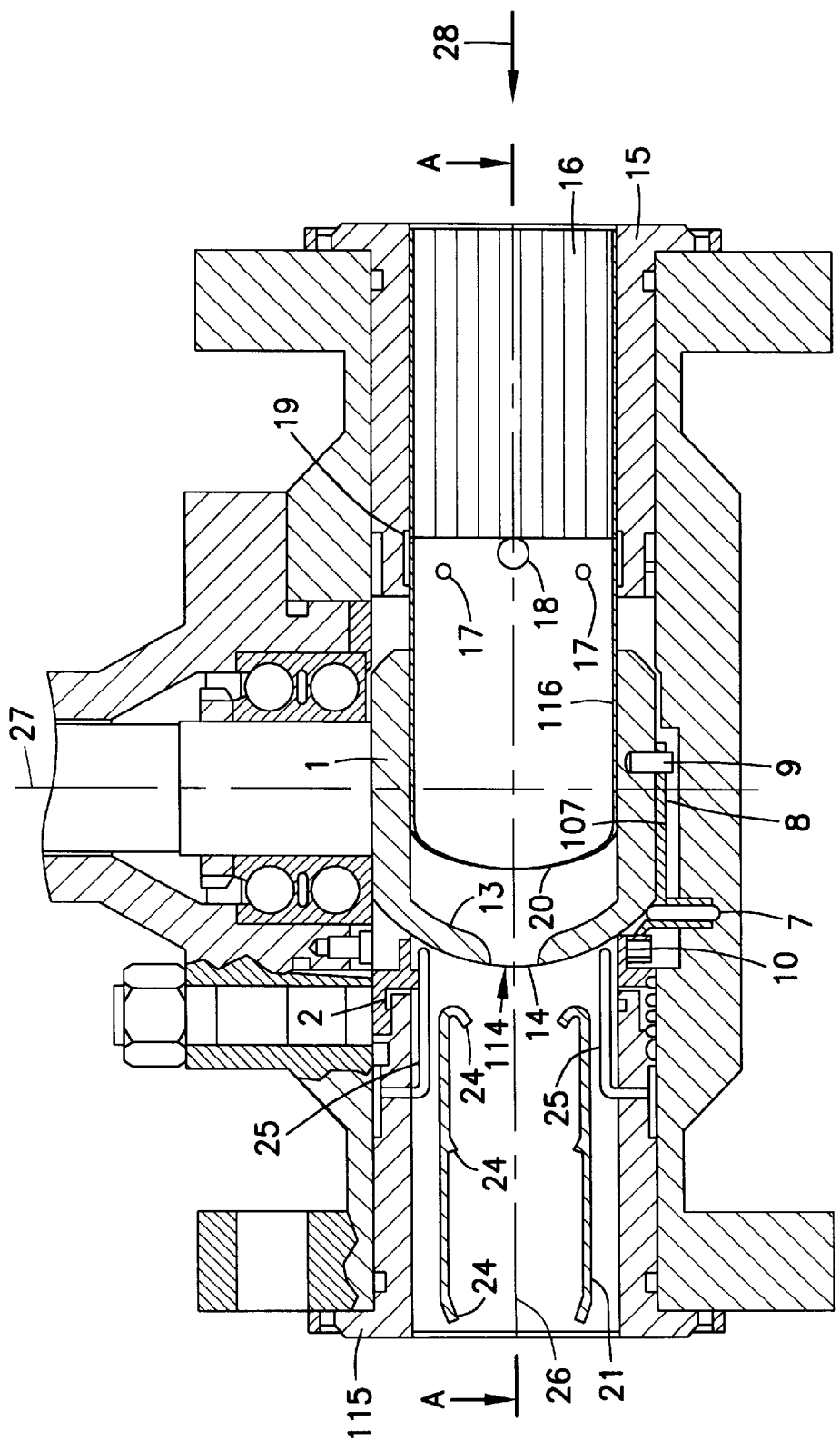
FIG. 1 is a longitudinal section through a metering valve for a gas mass flow, according to the invention.
Figure 2:
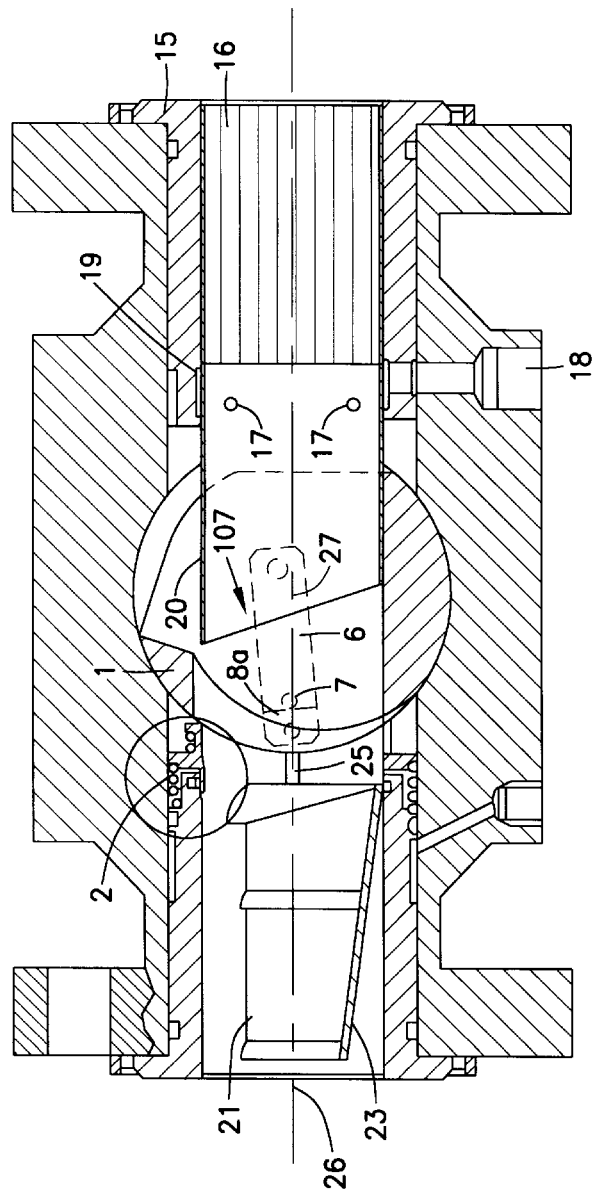
FIG. 2 is a section through the valve of FIG. 1 taken from above on the line A—A of FIG. 1.
Figure 2:
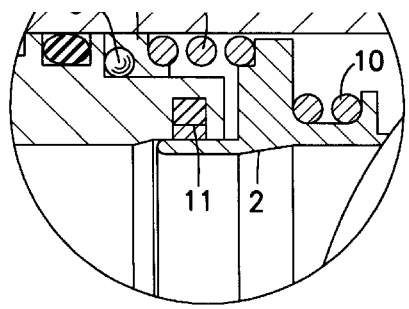
Figure 4:
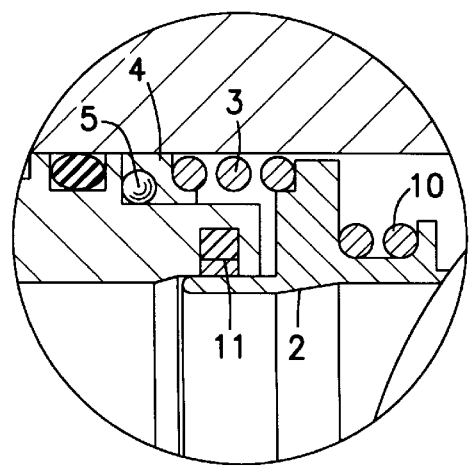
FIG. 4 is a considerably enlarged view of a detail of FIG. 2.

With reference to the accompanying figures, the valve of the present invention extends axially (FIG. 1), the valving element 1 rotates about the axis 27, to minimize the onset of turbulence due to changes in duct directions. The valving element 1 has a spherical geometry to facilitate the sealing of the ring 2 which varies the degree of closure of the passage port, in that the valving element enables the seal to be preserved even if misalignment is present. The ring 2 adheres perfectly to the spherical surface of the valving element 1 by virtue of a suitably preloaded spring 3 (FIG. 4) which rests on a bearing ring 4 provided with balls 5 enabling the ring-spring assembly to rotate about the axis 26 of the ring 2, in correlation with the opening and closure movement of the valving element 1 about the axis 27. This rotation is achieved by a mechanism 6 characteristic of this invention, which has the object of maintaining that edge portion exposed to the fluid efficient and always hydrodynamically equal, and which with wear could modify its influence on the position of the vena contracta. The mechanism consists of a lever 107 pivoted at 7, the longer arm 8 of which is moved by a pin 9 rigid with the valving element 1. The movement of the shorter arm 8a is transmitted to the seal ring 2 by a non-return device 10. In this manner the seal ring rotates in the form of small movements, because of the large reduction ratio on the angles undergone by the valving element, such movements also taking place when the valving element undergoes small rotations. The member which moves the ring, even infinitessimally, without the need for racks or teeth and clearances or relative insensitivity, is original and consists of a helix 10 (substantially a preloaded spring comprising a few turns) which when moved in one direction tends to become tightened about the drum formed by said ring 2 on which it is wound, causing a rotational movement, whereas when moved in the other direction it tends to open out and move by sliding along the drum, giving rise in this manner to a torque which is less than that due to the friction between the seal ring and ball of the valving element. The preloading results in immediate action, without having to take up slack, for the smallest angular movement of the valving element.

According to a characteristic of the state of the art, the seal ring is guided by the gasket ring 11, its balancing being achieved by suitably sizing the sealing radius on the basis of the radii of the edges of the contact region.

Figure 3:
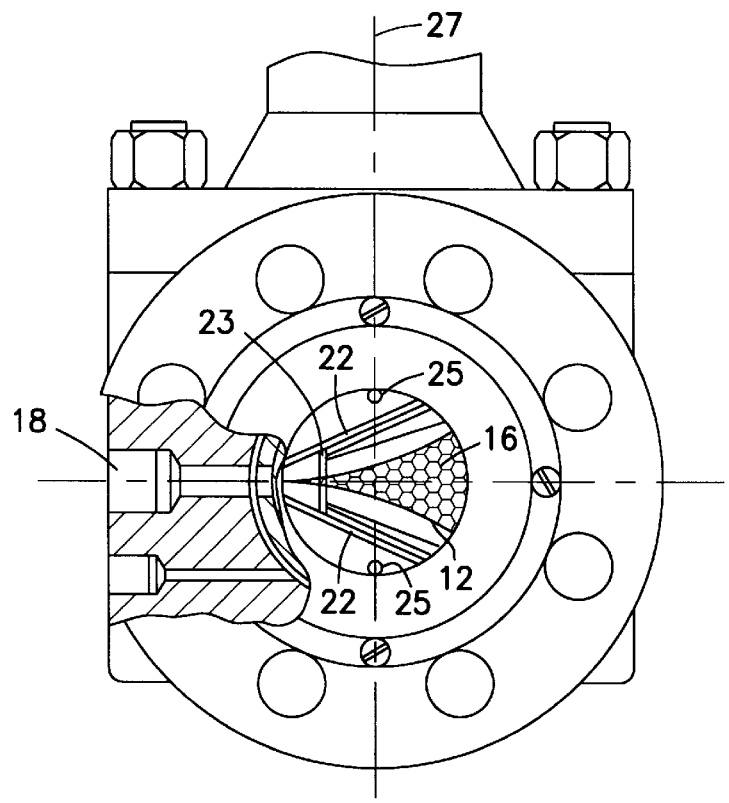
FIG. 3 is a partly sectional left hand side view of the valve of FIG. 1, to an enlarged scale.

According to a special characteristic of the present invention, the position and shape of the vena contracta are made to coincide, over a large portion, with the minimum passage section. This restricted section is located at the edge of an aperture 116 cut into the spherical surface, in accordance with an equipercentual profile 12 (FIG. 3). The exit port 114 is partially closed by the seal ring 2 urged by the spring 3 against the spherical surface. The geometry of the restriction edge is in the form of a converging curvature 13 which conveys the flow such that it assumes a direction, along a large part of the section, which is parallel to the axis 26 of the exit duct 115 at the end of the converging region 14. This characteristic eliminates further flow contraction downstream of the exit section. The fact that the vena contracta coincides with a passage section of known area facilitates the flow calculation. According to a special characteristic of the present invention, this result is achieved by shaping the curvature as a circular arc of radius equal to the width of the exit port. This dimensioning results in a practically flat exit velocity profile. This characteristic reduces the importance of correction factors which take account of single-dimension flow deviations from ideal behaviour, so reducing pressure and velocity variations in this section about the respective mean values. In the entry duct 15, into which the gas flows in the direction of the arrow 28, there is located a flow straightener 16, immediately downstream of which are positioned the upstream pressure taps 17 and the temperature sensor 18. This straightener consists of a series of small-diameter tubes, its purpose being to reduce the scale of turbulent pressure and velocity perturbations present in the flow. The pressure taps positioned along the contour of the entry duct are connected together by a manifold 19 which provides an initial filtering of the turbulence noise, already reduced by the straightener, by an averaging operation over several points of the section.

Measuring the temperature in the same section as the upstream pressure measurement enables the pressure to be measured close to the valving element without introducing errors in the calculation of the density and total entry pressure, these quantities being used in calculating the flow rate.

The entry duct 15 proceeds in the form of a prolongation tube 20 as far as the interior of the valving element, to guide the flow in such a manner as to considerably reduce the recirculation regions and consequently limit the accumulation of possible solid contaminants within the valve body. It is a characteristic of the present invention that the prolonged tube is dimensioned such that the front edge and the lateral generators have a very small clearance from the inner walls of the valving element. These inner walls of the valving element are characterised by a shape obtained as the envelope of the spaces generated by rotating the interior tube. In this manner secondary flows from regions of higher pressure as far as the restricted section are reduced. A further device characteristic of the present invention is inserted in the region downstream of the restriction. This is a jet stabilizer 21 inserted to eliminate oscillation of the stream emerging from the restriction. The purpose of the stabilizer is to force the jet to remain as centered as possible and to dissipate its kinetic energy by turbulent structures of reduced scale which introduce disturbances in the downstream pressure measurement only at high frequency. The stabilizer consists substantially of two walls 22 (FIG. 3) which divide the downstream duct into three sectors, namely a central sector and two lateral sectors. The two walls 22 are connected together by a wall 23 which creates a connection volume between the two lateral regions. The jet centering action is obtained by a series of restrictions subsequent to the first, (i.e., that of the valving element at maximum opening) by increasing passage areas consisting of inclined profiles 24 rigid with the walls 22.

This action is also obtained by a recirculation flow originating from the lateral ducts isolated by the jet turbulence and asymmetry. Each deviation of the main jet from the axis of symmetry causes a pressure increase upstream of the next restriction, from the side, with consequent centering action. The downstream pressure taps 25 consist of two tubes which place the take-off points in the least disturbed positions for measurement purposes.

Figure 5:
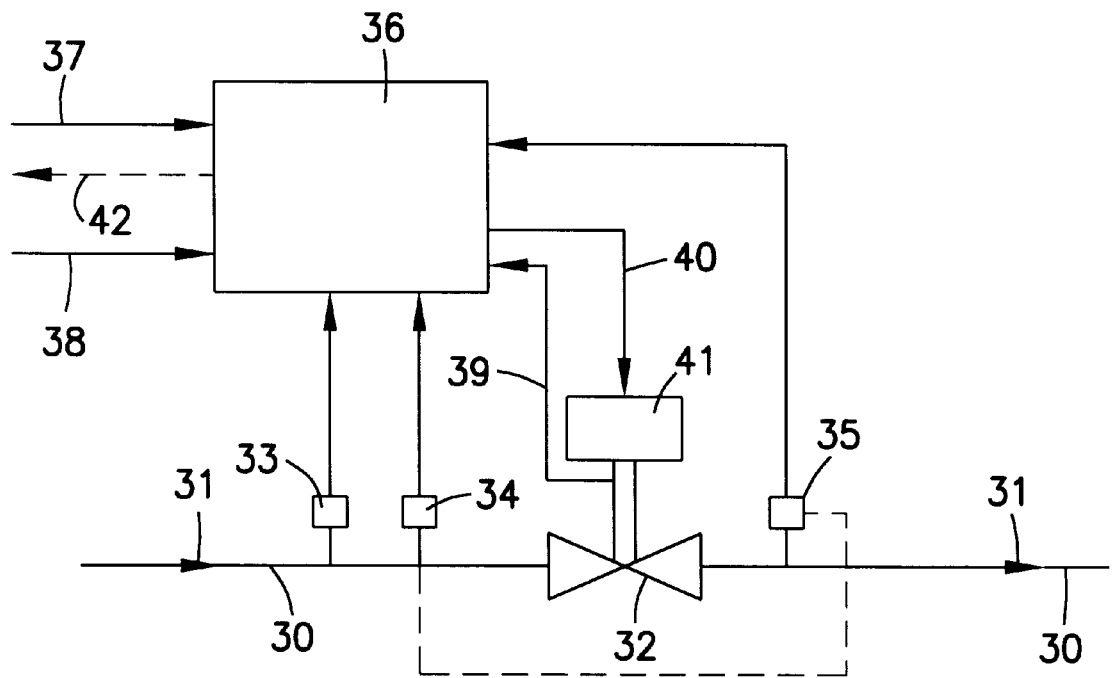
FIG. 5 is a block diagram for calculating and controlling a gas mass flow by the valve of the invention.

FIG. 5 shows the block diagram for calculating and controlling a gas mass flow.

In the figure, the reference numeral 30 indicates the pipe in which it is required to measure and control the gas mass flow flowing in the direction of the arrow 31, by means of a valve 32 according to the present invention. For this purpose the values measured by the valve 32, i.e. the upstream temperature 33, the upstream pressure 34 and the downstream pressure 35 are fed to a computing unit 36, to which are also fed the required mass flow value to the input 37 and the gas characteristics to the input 38, together with an indication of the position of the valve actuator 41 to the input 39. The computing unit processes the received data by a particular formula which provides the valving element position value corresponding to a restricted section area A2 such that that mass flow effectively passing through the valve 32 is equal to the set value at said input 37 and provides at its output 40 a control signal for said valve actuator 41.

Said particular formula linking the variables in play is given, preferably but not exclusive for the operation of the invention, by:

$$G = \phi A2 p1^0 \beta^{1/k} \sqrt{[\eta 12/z1RT1^0)(2k/[k-1])(1\beta^{(k-1)/k})]}$$

G=mass flow
A2=restricted section area
z=compressibility factor
R=gas elastic constant
k=isentropic evolution constant
η12=correction coefficient taking account of any deviation of the real gas behaviour from the hypothesis of polytropic evolution at constant exponent
ø=discharge coefficient: it includes the effects of flow non-unidimensionality and depends on the degree of opening and on the Reynolds number $T1^0$=total inlet gas temperature calculated from:

$$T1^0 = T1(1+[(k-1)/2k][G^2 zRT1/A1^2 kp1^2])$$

where:
A1=tube area at entry
p1=static pressure at entry
T1=absolute temperature
$p1^0$=total gas pressure at entry:

$$p1^0 = p1(T1^0/T1)^{k/(k-1)}$$

β=pressure ratio. The greater of the expressions:

$$p2/[p1^0(1+(\epsilon p2-1)M2) \text{ and } [2/(k+1)]k/(k-1)$$

where:
p2=pressure measured in vena contracta
εp2=correction coefficient for vena contracts pressure measurement under critical conditions. This can be determined experimentally as a function of the angle of opening of the valving element
M2=Mach number in vena contracts, where:

$$M2 = \sqrt{[(2/(k-1))(\beta^{(1-k)/k}-1)]}$$

The metering valve can also have other manners of operation, such as only measuring a variable flow rate, which can be effected with a fixed valving element opening or a fixed pressure drop (for example the minimum pressure drop compatible with the measurement range).

In this case the input 37 of FIG. 5 is replaced by an output 42 of the measured mass flow value. The total pressure drop can also be controlled, in which case a further input is required for measuring the pressure to be controlled.

I claim:

1. A gas mass flow metering valve, comprising an entry duct, an exit duct, a valve element having an exit port, a seal ring cooperating with said valve element, said seal ring being made to rotate by operating means, and means for measuring the pressure upstream and downstream of the valve element and the valve gas temperature, characterised in that fluidly coupled to said entry duct is a flow straightener, immediately downstream of which, within the valve body, there is positioned the upstream pressure measuring means, said entry duct being prolonged by a prolongation tube into the interior of the valve element to a point proximate the convergence region in correspondence with said exit port through an aperture in the valve element opposite said exit port, said valve element exit port having an edge geometry including a converging curvature arranged to convey the gas flow in a direction substantially parallel to the axis of the exit duct, which is provided in its interior with a flow stabilizer, the downstream pressure measuring means being positioned within the valve upstream of said flow stabilizer, proximate said exit port.

2. The valve as defined by claim 1, characterised in that said flow straightener is one of a honeycomb or multi-tube type.

3. The valve as defined by claim 1, characterised in that said flow stabilizer comprises two inclined walls substantially forming a C section dividing said exit duct into a central sector and two lateral flow recirculation sectors, said two inclined walls being coupled to a third wall connecting together said lateral flow recirculation sectors, said two inclined walls being provided on their inner facing surfaces with corresponding inclined deflectors defining ports which gradually increase in size towards the exit sort.

4. The valve as defined by claim 1, characterised in that said operating means for rotating the seal ring comprises a lever pivoted on the valve element, a first longer arm being moved by a pin rigid with the valving element, the movement of a second shorter arm being transmitted to the seal ring by a non-return device formed from a preloaded spiral spring wound about and forced onto an appropriate housing in said seal ring, said spring being coupled to said second shorter arm of the lever.

5. The valve as defined by claim 1, characterised in that said converging region of the valve element exit port is substantially a circular arc of radius equal to the width of said exit port.

6. The valve as defined by claim 1, characterised by enabling the flow rate to be measured and controlled by the formula:

$$G = \phi A_2 p_1^0 \beta^{1/k} \sqrt{[(\eta_{12}/z_1 RT_1^0)(2K/[k-1])(1-\beta^{(k-1)/k})]}$$

where:
G=mass flow
A2=restricted section area
z=compressibility factor
R=gas elastic constant
k=isentropic evolution constant
η12=correction coefficient taking account of any deviation of the real gas behaviour from the hypothesis of polytropic evolution at constant exponent
ø=discharge coefficient: it includes the effects of flow non-unidimensionality and depends on the degree of opening and on the Reynolds number
$T1^0$=total inlet gas temperature calculated from:

$$T1^0 = T1(1+[(k-1)/2K][G^2 zRT1/A1^2 kp1^2])$$

where:
A1=tube area at entry
p1=static pressure at entry
T1=absolute temperature
$p2^0$=total gas pressure at entry:

$$p1^0 = p1(T1^0/T1)^{k/(k-1)}$$

β=pressure ratio. The greater of the expressions:

$$p2/[p1^0(1+(\epsilon p2-1)M2)] \text{ and } [2/(k+1)]^{k/(k-1)}$$

where:
p2=pressure measured in vena contracts
εp2=correction coefficient for vena contracts pressure measurement under critical conditions, this can be determined experimentally as a function of the angle of opening of the valving element
M2=Mach number in vena contracta, where:

$$M_2 = \sqrt{[(2/(k-1))(\beta^{(1-k)/k} - 1)]}.$$

7. The valve as defined by claim 1, characterised in that the inner walls of said valve element have a shape obtained as the envelope of the spaces generated by rotating the interior tube.

8. A gas flow metering valve 32 comprising:
an exit duct 115 having an axis along its length and expelling gas substantially parallel to its axis;
a valve element 1 having an exit port 114 fluidly coupled to the exit duct 115, the valve element having a convergence region 14 defined by a converging curvature 13 arranged to convey the gas from the exit port substantially parallel to the exit duct axis;
an entry duct 15 fluidly coupled to the valve element and having a flow straightener 16 therein, the entry duct being lengthened by a prolongation tube 20 which extends into the valve element 1 to a point proximate the convergence region;
a flow stabilizer 21 fluidly interposed between the exit port 114 and the exit duct 115;
valve upstream and downstream pressure taps 34,35 for measuring gas pressure upstream and downstream of the valve element 1, the valve upstream pressure tap 34 being situated within the valve element immediately downstream of the flow straightener 16, the valve downstream pressure tap being situated within the valve element upstream and proximate the flow stabilizer 21;
means for measuring the temperature of gas 33 within the valve element; and
a sealing ring 2 cooperating with the valve element and being rotated by operating means.

9. The valve as defined by claim 8, wherein said flow straightener is one of honeycomb or multi-tube type.

10. The valve as defined by claim 8, wherein said flow stabilizer comprises two inclined walls 22 substantially forming a C-like section dividing said exit duct 115 into a central region and two lateral flow recirculation regions, said two inclined walls being coupled to a third wall 23 connecting together said lateral flow recirculation regions, said two inclined walls having on their inner facing surfaces inclined deflectors 24 defining ports which gradually increase in size towards the exit port.

11. The valve as defined by claim 8, wherein said operating means for rotating the sealing ring comprises a lever 107 pivoted on the valve element, a first longer arm 8 being moved by a pin 9 rigid with the valving element, the movement of a second shorter arm 8a being transmitted to the sealing ring by a non-return device 10 formed from a preloaded spiral wound about and forced onto an appropriate housing in said seal ring, said spring being coupled to said second shorter arm of the lever.

12. The valve as defined by claim 8, wherein said converging region of the valve element exit port is substantially a circular arc of radius equal to the width of said exit port.

13. The valve as defined by claim 8, wherein the flow rate is measured and controlled by the formula:

$$G = \phi A_2 p I^0 \beta^{1/k} \sqrt{[(\eta_{12}/z_I RT_1^0)(2K/[k-1])(1-\beta^{(k-1)/k})]}$$

where:
G=mass flow
$A_2$=restricted section area
z=compressibility factor
R=gas elastic constant
k=isentropic evolution constant
$\eta_{12}$=correction coefficient taking account of any deviation of the real gas behaviour from the hypothesis of polytropic evolution at constant exponent
ø=discharge coefficient: it includes the effects of flow non-unidimensionality and depends on the degree of opening and on the Reynolds number $T_1^0$=total inlet gas temperature calculated from:

$$T1^0 = T1(1 + [(k-1)/2K][G^2 zRT1/A1^2 kp1^2])$$

where:
$A_1$=tube area at entry
$p_1$=static pressure at entry
$T^1$=absolute temperature
$p_1^0$=total gas pressure at entry:

$$p1^0 = p1(T_1^0/T_1)^{k/(k-1)}$$

β=pressure ratio, the greater of the expressions:

$$p^2/[p1^0(1+(\epsilon_{p2}-1)M_2)] \text{ and } [2/(k+1)]^{k/(k-1)}$$

where:
$p^2$=pressure measured in vena contracta
$\epsilon_{p2}$=correction coefficient for vena contracta pressure measurement under critical conditions, this can be determined experimentally as a function of the angle of opening of the valving element
$M_2$=Mach number in vena contracta, where:

$$M_2 = \sqrt{[(2/(k-1))(\beta^{(1-k)/k}-1)]}.$$

* * * * *